United States Patent
Copos et al.

(10) Patent No.: US 9,772,931 B2
(45) Date of Patent: Sep. 26, 2017

(54) DETERMINING A VALID INPUT FOR AN UNKNOWN BINARY MODULE

(71) Applicant: FUJITSU LIMITED, Kawasaki-shi, Kanagawa (JP)

(72) Inventors: Bogdan Copos, Davis, CA (US); Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 61 days.

(21) Appl. No.: 14/620,106

(22) Filed: Feb. 11, 2015

(65) Prior Publication Data

US 2016/0232081 A1    Aug. 11, 2016

(51) Int. Cl.
G06F 9/44     (2006.01)
G06F 11/36    (2006.01)

(52) U.S. Cl.
CPC ...... *G06F 11/3684* (2013.01); *G06F 11/3688* (2013.01)

(58) Field of Classification Search
USPC ........................................................ 717/124
See application file for complete search history.

(56) References Cited

U.S. PATENT DOCUMENTS

| | | | | |
|---|---|---|---|---|
| 7,178,063 B1 * | 2/2007 | Smith | ................. | G06F 11/3688 714/38.1 |
| 7,873,945 B2 | 1/2011 | Musuvathi et al. | | |
| 8,676,540 B1 * | 3/2014 | Welch | ..................... | G01P 15/08 702/187 |
| 2003/0163286 A1 * | 8/2003 | Yasugi | ............... | G05B 19/4065 702/185 |
| 2004/0181713 A1 * | 9/2004 | Lambert | ............. | G06F 11/3688 714/48 |
| 2007/0016685 A1 * | 1/2007 | Crume | ............. | G06F 17/30507 709/232 |
| 2009/0007077 A1 * | 1/2009 | Musuvathi | .......... | G06F 11/3688 717/130 |

* cited by examiner

*Primary Examiner* — Hang Pan
(74) *Attorney, Agent, or Firm* — Maschoff Brennan

(57) ABSTRACT

A method includes selecting a set of printable characters as one or more test inputs for a binary module having no known valid input. The method also includes executing the binary module with the set of printable characters as the one or more test inputs for the binary module. The method also includes determining a number of instructions executed by the binary module responsive to being executed with the set of printable characters. The method also includes generating set data including the one or more printable characters associated with the number of instructions executed for each of the one or more printable characters. The method also includes analyzing the set data to identify one or more printable characters as one or more valid inputs for the binary module based on a comparison of the number of instructions associated with the one or more printable characters and a threshold range.

18 Claims, 10 Drawing Sheets

DETERMINING A VALID INPUT FOR AN UNKNOWN BINARY MODULE

FIELD

The embodiments discussed herein are related to determining a valid input for an unknown binary module.

BACKGROUND

Efficient testing of a binary file may be improved by knowledge of which inputs are valid for the binary file. The binary file may include code and routines that a human may interpret as text. However, the text included in the code and routines of the binary file are not human-readable. It is impossible for human testers of the binary file to determine valid inputs for the binary file by reviewing the code and routines of the binary file because the code and routines are not human readable. As a result, the human testers may review specifications, documentation or source code associated with the binary file in order to determine which inputs are valid for the binary file. These valid inputs may then be used to achieve more efficient testing of the binary file.

SUMMARY

According to an aspect of an embodiment, a method includes selecting a set of printable characters as one or more test inputs for a binary module having no known valid input. The method also includes executing the binary module with the set of printable characters as the one or more test inputs for the binary module. The method also includes determining, for each of the printable characters included in the set of printable characters, a number of instructions executed by the binary module responsive to being executed with the set of printable characters. The method also includes generating set data including the one or more printable characters associated with the number of instructions executed for each of the one or more printable characters. The method also includes analyzing the set data to identify one or more printable characters as one or more valid inputs for the binary module based on a comparison of the number of instructions associated with the one or more printable characters and a threshold range.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
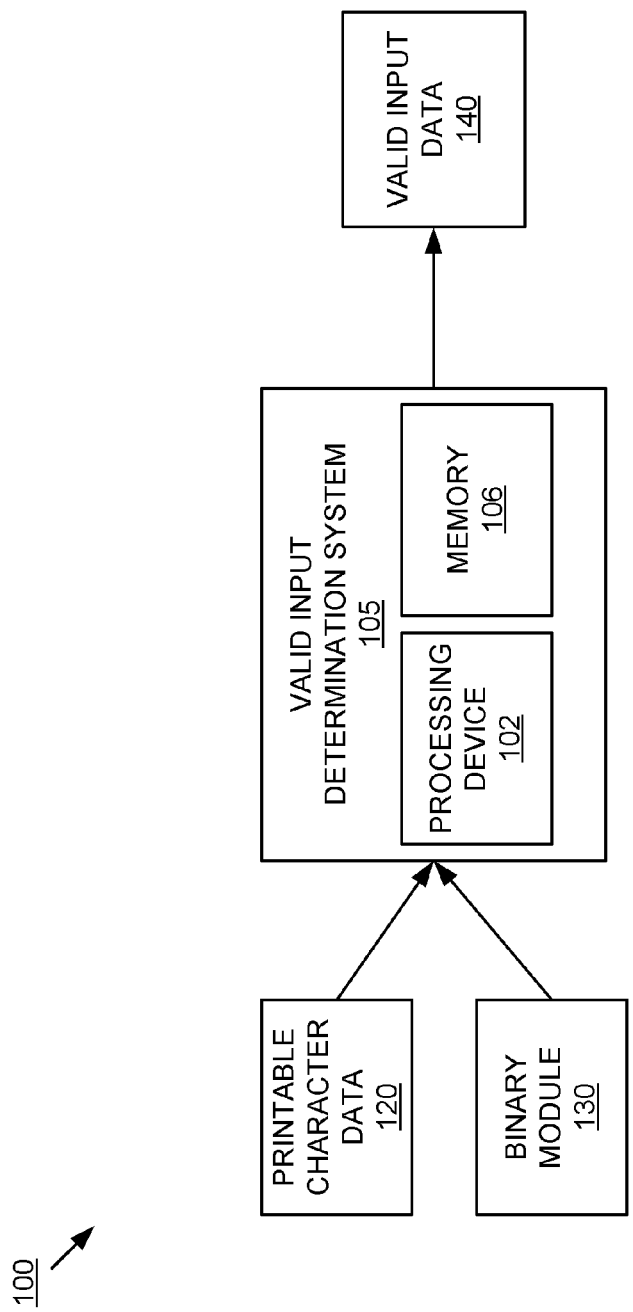
FIG. 1A is a block diagram of an example operating environment for a valid input determination system.

The embodiments discussed herein are related to determining a valid input for an unknown binary module. The valid input may include a valid input string for the unknown binary module. The valid input string may include one or more valid characters. The valid input string and the valid characters are described in more detail below.

The unknown binary module may include a binary file for a program. The binary file may include code and routines encoded in binary form and stored on a non-transitory computer-readable storage medium for execution by a processing device. Although the code and routines of the binary file may include portions that may be interpreted by a human as text, the code and routines of the binary file are not human-readable.

The binary module may be described as "unknown" because a human tester may not know any valid inputs for the binary file included in the binary module. For example, the specification, documentation or source code associated with the binary file may not be available to the human tester of the binary module, and so, the tester may not be able to determine valid inputs for the binary file included in the binary module.

Currently, there is no acceptable method to determine a valid input for an unknown binary module. There are some requirements for being considered an acceptable method for determining a valid input for an unknown binary module. A first requirement may include consistently covering a high percentage of the code and routines included in the binary file (excluding dead code) of the unknown binary module. For example, one or more test inputs selected for testing the binary file may cover one hundred percent or near one hundred percent of the code and routines for the binary file (e.g., ninety percent to one hundred percent of the binary file, excluding dead code and routines). Some of the existing methods rely on generation of random test inputs for testing the unknown binary file. Unfortunately, testing methods that include generation of random test inputs for testing the unknown binary file are unable to consistently cover a high percentage of the code and routines for the unknown binary file because randomly generated test inputs are inherently incompatible with the goal of consistently covering a high percentage of the code and routines for the unknown binary file. As a result, these existing methods are not able to consistently cover a high percentage of the code and routines for the binary file, and so, these methods are not considered acceptable.

Another requirement for being considered an acceptable method for determining valid inputs for unknown binary modules may include the ability to be effectively implemented without a specification, documentation or source code associated with the binary file. This requirement may be beneficial in the field of autonomous software security where it is beneficial for a computer system to automatically determine vulnerabilities in software. In some situations, the binary file may be available to human testers of the binary module, but the specification, documentation or source code associated with the binary file may be unavailable. Some existing methods attempt to determine valid inputs for unknown binary modules. However, these methods rely on randomly generated test inputs or have other deficiencies.

Another requirement for being considered an acceptable method for determining valid inputs for unknown binary modules may include platform independence. Platform independence may beneficially improve the portability of the methodology as well as provide other benefits.

As mentioned above, methods exist that attempt to determine valid inputs for unknown binary modules. Unfortunately, these methods have numerous deficiencies that prevent them from being considered acceptable.

One such method may be referred to as a "symbolic execution." The symbolic execution approach includes determining inputs for the binary file included in the unknown binary module which may drive the program along various execution paths including possibly crashing the program. This approach may be successful in some isolated instances. However, one deficiency associated with the symbolic execution approach is that the source file associated with the binary module may be needed to implement this approach. In some instances the source file is unavailable. As a result, in some instances implementation of the symbolic execution approach is not possible since the source file is needed but unavailable, and the symbolic execution approach is not considered an acceptable methodology. Another deficiency of the symbolic execution approach is that it does not scale well. The symbolic execution approach also does not work with many common scenarios. For example, the symbolic execution approach has known problems working with programs that include floating point arithmetic or when the constraints on the input gathered during execution of the program are non-linear. For these reasons and others, the symbolic execution approach is not an acceptable method for determining valid inputs for unknown binary modules.

Another approach is known as a "black-box fuzzing." This approach may include selecting a string and randomly altering the string. The string may be fed to the binary module as an input after each alteration. Although this approach may work given enough time, most of the inputs generated by black-box fuzzing are invalid inputs. This is problematic since valid inputs are needed in order to mutate and identify additional valid inputs. An additional problem associated with black-box fuzzing is that this approach does not guarantee high coverage of the binary file included in the unknown binary module since it is reliant on random inputs, and so, it is impossible to know whether the results of implementing black-box fuzzing achieve high coverage.

Another approach is known as "white-box fuzzing." The white-box fuzzing approach is similar to black-box fuzzing, with the exception that valid inputs are used to gather symbolic constraints, which may then be analyzed to produce test inputs. The white-box fuzzing approach may be considered an improvement over black-box fuzzing since it includes at least some inputs that are not arrived at randomly. However, the white-box approach requires valid inputs as a prerequisite before it may be implemented to determine test input. In some instances valid inputs will not be available as seeds for the white-box fuzzing approach. For this reason, the white-box fuzzing approach implemented by itself is unable to solve the problem of determining valid inputs for unknown binary modules.

Another approach is known as "unit testing," in which the code for a program is divided into units and tested systematically. Although unit testing may be able to achieve high coverage testing of the binary file in some instances, this approach always requires source files or other documentation associated with the binary file such as the specification for the program. Without this information, unit testing may not be implemented. As such, the unit testing approach is unable to solve the problem of determining valid inputs for unknown binary modules since it requires source files or some other documentation. Another deficiency associated with the unit testing approach is that it is platform dependent. The unit testing approach is also considered to be slow and expensive.

Another approach is known as "specification-based testing". However, as the name implies, the specification-based testing approach always requires source files or other documentation associated with the binary file such as the specification for the program. As such, this approach is unable to solve the problem of determining valid inputs for unknown binary modules since it requires source files or some other documentation. Similar to unit testing, the specification-based testing approach is also platform dependent and considered to be slow and expensive.

Other approaches may include "reverse code engineering." These approaches may include: the "information exchange analysis" approach; the "disassembly" approach; and the "decompilation" approach. The information exchange analysis approach may not be effective if no information is exchanged by the program, and so, this approach is limited and not acceptable for this reason. The disassembly approach relies on a static or dynamic analysis of raw assembly code, which has a number of deficiencies. For example, static or dynamic analysis of raw assembly code is computationally expensive, imprecise, does not scale well and likely to introduce significant performance overheads. The decompilation approach attempts to reconstruct the source code associated with the binary file and proceed with the testing using the source code and the binary file. However, in practice the decompilation approach does not work in many situations and may render a source code file that is unusable or not high quality because in actuality it differs substantially from the original source code file it attempts to reconstruct.

The deficiencies of these and other systems may be overcome by a valid input determination system as described herein. In some implementations, the valid input determination system may not rely on random input generation. In this way, the valid input determination system may achieve high coverage of the program when determining one or more valid inputs. By comparison, techniques that rely on random input generation such as black-box fuzzing are unable to achieve high coverage when determining valid inputs. The valid input determination system may also be platform independent. In this way, the valid input determination system may be portable and used in a variety of operating environments. The valid input determination may also be successfully implemented without source code or documentation associated with the program or the binary file. In this way, the valid input determination system may be used for determining one or more valid inputs for an unknown binary module. The valid input determination may also be implemented without packet sniffing, bus analysis or any other methodology that relies on information exchange. In this way, the valid input determination system may be implemented without including use of reverse code engineering techniques.

The valid input determination system described herein may include a computing device. For example, the valid input determination system may include a personal computer, laptop, tablet computer, server or any processor-based computing device including server software. The valid input determination system may include a memory and a processor device. The processor device may be programmed to perform one or more steps of a method 500 described below with reference to FIGS. 5A, 5B, 5C and 5D. One or more example implementations of the valid input determination system will be described below.

The binary file of the unknown binary module may include a compiled version of a program. The program may accept one or more inputs. The inputs for the program may include one or more input strings. The program may include code and routines describing the functionality of the program. The code and routines of the program may also define which inputs are valid for the program and the binary file which is a compiled version of the program. Any input not defined as valid by the code and routines of the program may be an invalid input for the program and the binary file. An input which is invalid for the program and the binary file may also be invalid for the binary module which includes the binary file.

An input string for the program may include one or more indices and one or more printable characters. An index may include the position in the string at which the printable character occurs. For example, if the input strings that are accepted are "Hello" and "Howdy," then the indices are "0," "1," "2," "3" and "4." In this example, the valid character at index "0" includes the printable character "H." The valid characters at index "1" include the printable characters "e" and "o." The valid characters at index "2" include "1" and "w." The valid characters at index "3" include "1" and "d." The valid characters at index "4" include "o" and "y."

To be considered a valid input string, each of the characters included in the input string may be valid for the program or the binary file. For any given index of the valid input string, a majority of the printable characters available for use in the input string may be invalid. The valid input determination system may be configured to receive a set of printable characters and iteratively test the set of printable characters to determine if they are valid characters for different indexes of a valid input string for the unknown binary module.

For example, each of the printable characters included in the set of printable characters may be used as a test input for the unknown binary module for a given index of the input string. The test input may include a string of one or more printable characters. For instances where multiple printable characters are included in the test input, the different printable characters may be concatenated so that they are associated with different indices of the test input.

The memory of the valid input determination system may include a user space. The user space may include a portion of the memory in which user processes run. For example, the user space may include a portion of the memory where the unknown binary module may be executed using the test input to determine whether the test input is valid for the unknown binary module at the given index.

In some implementations, the valid input determination system may determine whether the test input is valid for the given index by analyzing a number of instructions executed in the user space when the unknown binary module is executed using a test input as the input for the unknown binary module. At a given index "i," the unknown binary module may be provided with an input string including "i+1" characters to be used as test inputs for the unknown binary module. In some implementations, each of the printable characters included in the set of printable characters (except "[space]") may be used as test inputs for the unknown binary module at the given index. The unknown binary module may execute instructions in the user space of the memory responsive to being executed using the test input as the input for the unknown binary module. The number of instructions executed for each test input may be monitored and recorded. The valid input determination system may analyze the number of instructions executed in the user space for each test input at the given index.

In some implementations, the valid input determination system may determine the number of instructions executed for a printable character at the given index. The number of executed instructions may be stored in the memory of the valid input determination system and associated with the printable character which resulted in that number of instructions being executed. The valid input determination system may determine whether the number of instructions executed for a particular printable character is outside a threshold range. In some implementations, this process may be repeated for each of the printable characters included in the set of printable characters since each of the printable characters included in the set may be used as a different test input. The valid input determination system may determine that printable characters associated with a number of instructions having value which is outside of the threshold range may be candidates for inclusion in a valid input for the unknown binary module. Printable characters associated with a number of instructions having a value inside of the threshold range may be excluded as candidates for inclusion in the valid input for the unknown binary module.

The threshold range may be determined by the valid input determination system based on a mode of the number of executed instructions and a testing constant. The mode may include the mode for the number of executed instructions. For example, the number of executed instructions may be stored in a set. The set may include one or more number values. The number values may represent the number of instructions executed for each input. For example, assume that a first input resulted in one hundred instructions being executed. The number value for the first input may be the number "one hundred." The set may include other number values for other inputs. The mode may include the number value that appears most often in the set.

The testing constant may be referred to as "epsilon" or "the testing constant." The testing constant may include any positive real number. The upper limit of the threshold range may be determined by the valid input determination system by adding the testing constant to the mode. The lower limit of the threshold range may be determined by the valid input determination system by subtracting the testing constant from the mode. As described in above, in some implementations the valid input determination system uses each printable character as a different test input for the unknown binary module and records a set of data including the number of instructions executed for each test input. The mode used to determine the threshold range may include the mode for the set of data including the number of instructions executed for each test input. In some implementations, the valid input determination system may determine that any printable character whose use as an input for the unknown binary module results in a number of executed instructions outside of the threshold range is a candidate for inclusion in the valid input string for the unknown binary module.

Embodiments of the present invention will be explained with reference to the accompanying drawings.

FIG. 1A is a block diagram of an example operating environment 100 for a valid input determination system, arranged in accordance with at least one embodiment described herein. The operating environment 100 may include the following elements: printable character data 120; a binary module 130; a valid input determination system 105; and valid input data 140. The printable character data 120 and the binary module 130 may be inputted to the valid input determination system 105. The valid input determination system 105 may output the valid input data 140. The valid input determination system 105 may output the valid input data 140 responsive to receiving one or more of the printable character data 120 and the binary module 130.

The printable character data 120 may include data describing one or more printable characters. For example, the printable character data 120 may include data describing the set of printable characters. In some implementations, the printable character data 120 may include a list of one or more printable characters.

The binary module 130 may include a binary file. The binary file may include a compiled version of a program. The program may include code and routines configured to provide functionality for a processor-based computing device. The binary module 130 may be described as an "unknown" binary module. The binary module 130 may be described as "unknown" because a human tester of the binary module 130 may not know any valid inputs for the binary file included in the binary module. For example, the specification, documentation or source code associated with the binary file may be unavailable, and so, the human tester may not be able to determine valid inputs for the binary file included in the binary module 130.

The binary file may include code and routines encoded in binary form. Although the code and routines of the binary file may include portions that may be interpreted by a human as text, the code and routines of the binary file are not human-readable.

The valid input determination system 105 may include a processor-based computing device. For example, the valid input determination system 105 may include a hardware personal computer, laptop, tablet computer, mainframe, server device or any other processor-based computing device configured to function as a server.

In some implementations, the valid input determination system 105 may include a processor-based computing device programmed to perform one or more blocks of the method 500 described below with reference to FIGS. 5A, 5B, 5C and 5D. For example, the valid input determination system 105 may include a special-purpose computing device programmed to perform one or more blocks of the method 500 described below with reference to FIGS. 5A, 5B, 5C and 5D.

The valid input determination system 105 may be configured to receive the printable character data 120 and the binary module 130 as inputs. The valid input determination system 105 may analyze the printable character data 120 to determine the valid input data 140.

The valid input determination system 105 may improve the performance of a computer system by enabling the computer system to execute binary modules 130 whose valid inputs and behaviors and effect on the computer system are unknown. In this way, the valid input determination system 105 may allow the computer system to use binary modules 130 which may otherwise go unused. For example, the valid input determination system 105 may beneficially determine a maximum input size for the binary module 130. The maximum input size for the binary module 130 may include the input size that results in a buffer overflow event when the binary module 130 is executed by the computer system (however, in some examples exceeding the maximum input size may not result in a buffer overflow event). Accordingly, having information about the maximum input size may beneficially improve the computer system by allow the computer system to execute the binary module 130 without causing a buffer overflow event.

The valid input data 140 may include data describing the one or more valid inputs for the binary module 130. The valid input determination system 105 may determine the valid input data 140 based on one or more of the printable character data 120 and the binary module 130. The valid inputs for the binary module 130 described by the valid input data 140 may include one or more printable characters that have been selected by the valid input determination system 105 from the printable character data 120 as valid characters to be included in a valid input for the binary module 130. The valid inputs described by the valid input data 140 may include one or more valid input strings. For example, a valid input described by the valid input data 140 may include a string including one or more of the valid characters selected from the printable character data 120.

The valid input data 140 may be used to determine additional valid inputs for the buffer module 130. For example, the valid input described by the valid input data 140 may be used as a seed for a white-box fuzzer. The white-box fuzzer may then determine additional valid inputs for the binary module 130 based on the valid input described by the valid input data 140.

The valid input data 140 determined by the valid input determination system 105 may also be used to determine one or more input characteristics that are associated with exceptions for the binary module 130. For example, one or more valid inputs described by the valid input data 140 may be used as an input for a fuzzer. The fuzzer may include code and routines used to analyze data to determine which characteristics of the data may cause a computer system to have exceptions, memory leaks or other deficiencies. The one or more valid inputs may be fuzzed by the fuzzer. Fuzzing the one or more valid inputs may beneficially provide data describing which input characteristics are associated with exceptions, memory leaks or other deficiencies. In this way, valid input data 140 determined by the valid input determination system 105 may be used to improve the performance of a computer system by reducing the instances of exceptions, memory leaks or other deficiencies associated with the computer system.

The valid input determination system 105 may include a processing device 102 and a memory 106. The processing device 102 may include an arithmetic logic unit, a microprocessor, a general-purpose controller, or some other processor or processor array to perform computations and provide electronic display signals to a display device. The processing device 102 may process data signals. The processing device 102 may include various computing architectures including a complex instruction set computer (CISC) architecture, a reduced instruction set computer (RISC) architecture, or an architecture implementing a combination of instruction sets. Although FIG. 1A includes a single processing device 102, multiple processing devices 102 may be included. Other processors, operating systems, sensors, displays, and physical configurations are possible.

In some implementations, the processing device 102 may be programmed to perform one or more blocks of the method 500 described below with reference to FIGS. 5A, 5B, 5C and 5D. For example, the processing device 102 may include a special-purpose computing device programmed to perform one or more blocks of the method 500 described below with reference to FIGS. 5A, 5B, 5C and 5D.

The memory 106 may include a non-transitory computer-readable medium. The memory 106 may store instructions and/or data that may be executed by the processing device 102. The instructions and/or data may include code for performing the techniques described herein. The memory 106 may include a dynamic random access memory (DRAM) device, a static random access memory (SRAM) device, flash memory, or some other memory device. In some instances, the memory 106 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In some implementations, one or more of the printable character data 120, the binary module 130 and the valid input data 140 may be stored on the memory 106.

In some implementations, the processing device 102 may be communicatively coupled to the memory 106 to access and execute the instructions and/or data stored therein. For example, the memory 106 may store code and routines programmed to perform one or more blocks of the method 500 described below with reference to FIGS. 5A, 5B, 5C and 5D, and the processing device 102 may access the memory 106 and execute the code and routines stored therein to perform the one or more blocks of the method 500.

In some implementations, the memory 106 may include a user space. The user space may include a portion of the memory 106 in which the user processes run. For example, the binary module 130 may be executed and ran in the user space of the memory 106.

Figure 1B:
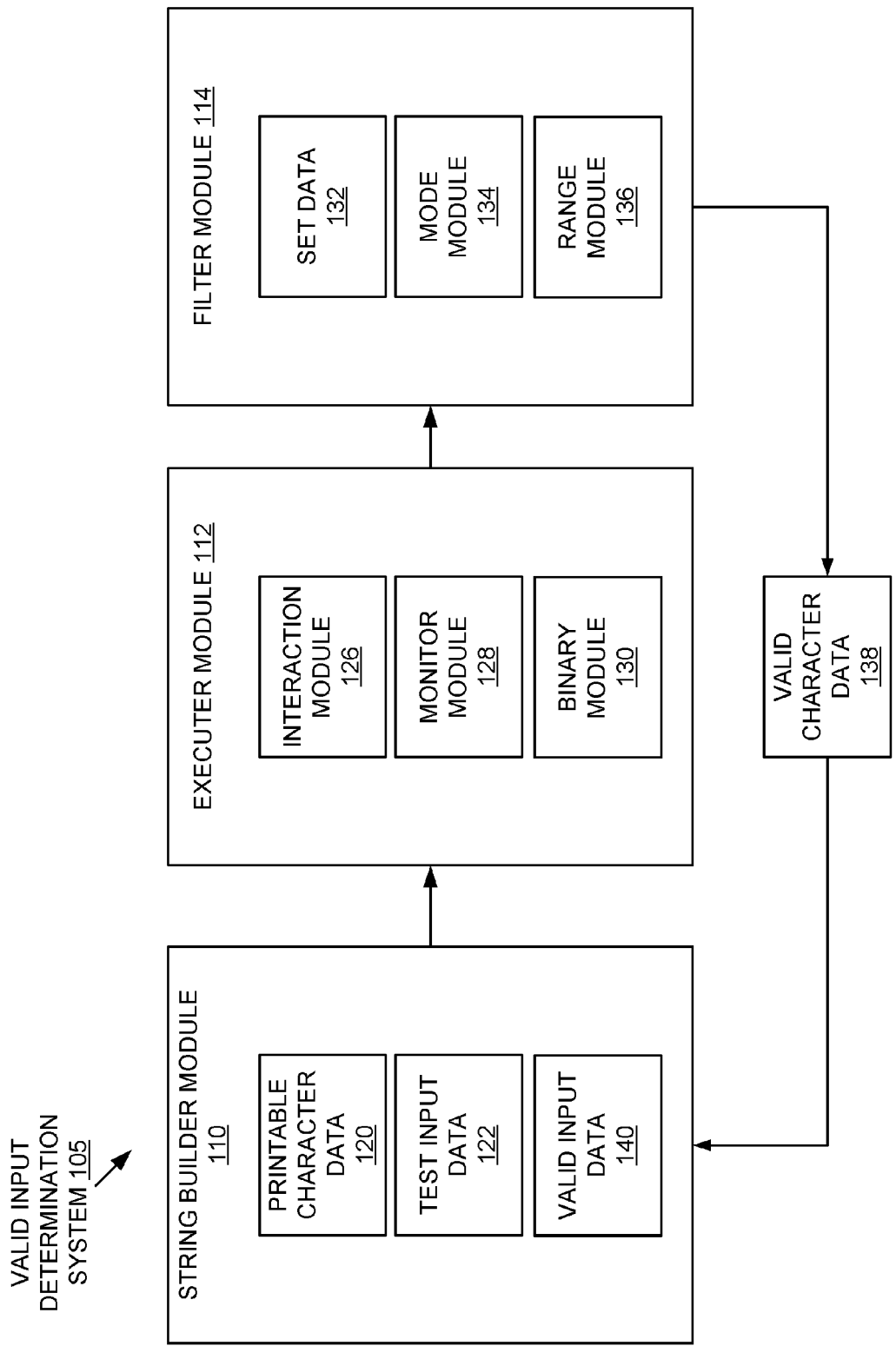
FIG. 1B is a block diagram of an example valid input determination system.

FIG. 1B is a block diagram of an example valid input determination system 105, arranged in accordance with at least one embodiment described herein. In some implementations, the valid input determination system 105 may include: a string builder module 110; an executer module 112; and a filter module 114.

The string builder module 110 may include code and routines configured to provide test input data 122 to the executer module 112. The test input data 122 may include data describing one or more printable characters that are selected by the string builder module 110 from the printable character data 120. The string builder module 110 may select the one or more printable characters included in the test input data 122 so that the selected printable characters may be tested by the executer module 112 and the filter module 114 to determine whether they include one or more valid characters to be included in a valid input string for the binary module 130 at a given index.

In some implementations, the string builder module 110 may iteratively select the printable characters from the printable character data 120 to serve as test input data 122 until all printable characters included in the printable character data 120 are tested by the executer module 112 and the filter module 114. In this way, the valid input determination system 105 does not rely on random selection of test inputs when determining valid characters for the binary module 130 since the available printable characters included in the printable character data 120 may serve as a test input for the binary module 130.

As will be described in more detail below with reference to the executer module 112 and the filter module 114, the executer module 112 and the filter module 114 may analyze the test input data 122 to determine the presence of one or more valid characters for a given index among the one or more printable characters described by the test input data 122.

In some implementations, the test input 122 may include a command and an argument. The executer module 112 and the filter module 114, the executer module 112 and the filter module 114 may analyze the test input data 122. The analysis may include determining if the test input 122 including the command and the argument is included in the one or more valid inputs described by the valid input data 140.

The string builder module 110 may receive valid character data 138. For example, the string builder module 110 may receive the valid character data 138 from the filter module 114. As will be described in more detail below with reference to the filter module 114 and the valid character data 138, the valid character data 138 may describe the one or more valid characters for a given index of a valid input string for the binary module 130.

Figure 2A:
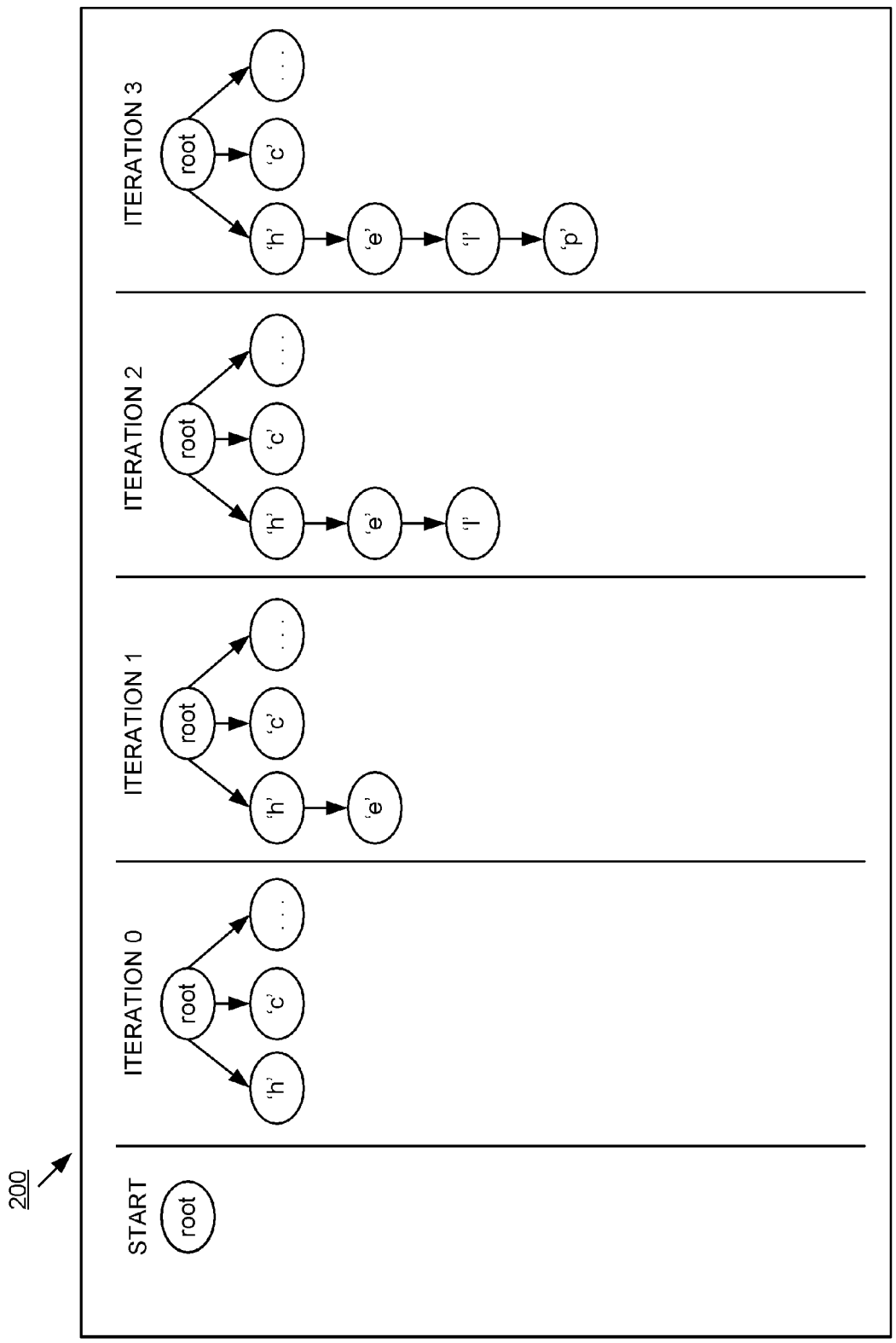
FIG. 2A is a block diagram depicting an example of building a string in series over multiple iterations.
Figure 2B:
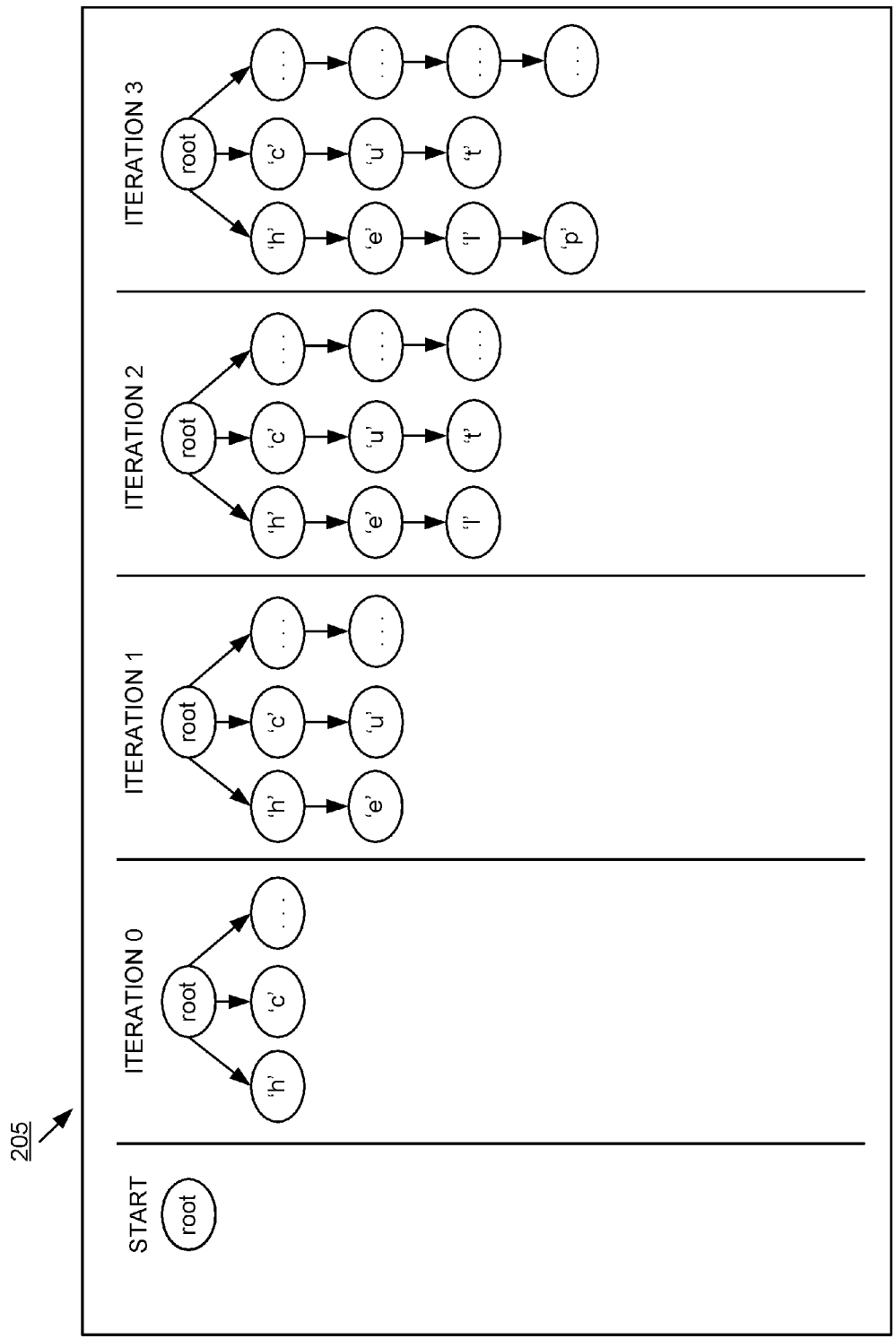
FIG. 2B is a block diagram depicting an example of building a string in parallel over multiple iterations.

The string builder module 110 may include code and routines configured to build one or more valid inputs for the binary module 130 based on the valid character data 138. A valid input may include a string formed from one or more of the valid characters described by the valid character data 138. This string may include the valid input string for the binary module 130. The string builder module 110 may build the valid input string using an iterative process. FIGS. 2A and 2B depict examples of strings built by the valid input determination system 105 according to some implementations.

In some implementations, the string builder module 110 may be communicatively coupled to one or more of the executer module 112 and the filter module 114. The string builder module 110 may include one or more of the following elements: printable character data 120; test input data 122; and valid input data 140.

The printable character data 120 and the valid input data 140 were described above with reference to FIG. 1A, and so, these descriptions will not be repeated here.

The test input data 122 may include data describing one or more printable characters selected from the printable character data 120 as candidates for inclusion in the valid input data 140. The different printable characters described by the test input data 122 may each be referred to collectively or individually as a "test input." The test input data 122 may be provided to the executer module 112. The executer module 112 may execute the binary module 130 using the test input described by the test input data 122 as the input for the binary module 130. The executer module 112 may determine set data 132 based on the execution of the test input data 122. The filter module 114 may determine that one or more characters included in the test input data 122 are valid characters for a given index of a valid input string. The filter module 114 may identify the valid characters based on the set data 132. The filter module 114 may transmit valid character data 138 describing one or more valid characters to the string builder module 110.

The string builder module 110 may receive the valid character data 138. In some implementations, the valid characters described by the valid character data 138 may include candidates for inclusion in the valid input data 140. The string builder module 110 may store the valid character data 138 in a memory such as memory 106 described above for FIG. 1A. In some implementations, the string builder module 110 may store the valid characters described by the valid character data 138 as one or more valid input strings for the binary module 130. The one or more valid input strings may be included in the one or more valid inputs and described by the valid input data 140. In this way, valid characters may be selected from the printable character data 120, analyzed for validity as inputs for the binary module 130 and stored as one or more valid input strings for the binary module 130 described by the valid input data 140.

The executer module 112 may include code and routines configured to execute the binary module 130 using the test input data 122. In some implementations, the executer module 112 may execute the binary module 130 using the test input data 122 in the user space of the memory 106 described above with reference to FIG. 1A. In some implementations, the executer module 112 may execute the binary module 130 using a performance analyzing tool such as perf, the GNU Debugger (sometimes called "GDB"), Valgrind's Callgrind tool, or any other performance analyzing tool. In this way the executer module 112 may: execute the binary module 130 using the test input data 122; monitor and count the number of instructions being executed by the binary module 130 after executing the binary module 130 using the test input data 122 as an input for the binary module 130; and store data describing the number of instructions being executed by the binary module 130 and the printable character associated with the execution of these instructions. The data stored describing the number of instructions being executed will be described in more detail below with reference to the set data 132.

In some implementations, using perf to monitor and count the number of instructions being executed by the binary module 130 may result in an inaccurate count of the number of instructions being executed. Accordingly, in some implementations the executer module 112 may be configured to add a hard-coded value to the count. The hard-coded value may be a positive whole number or a float selected from the range of one to one hundred. In some implementations, the executer module 112 may execute the binary module 130 two or more times in order to verify the validity of the count. If the count is determined to be inaccurate due to the executer module 112 identifying a difference in the count over multiple executions of the binary module 130, then the executer module 112 may be configured to select and add the hard coded value to the count. Additional error detection and correction for the count will be described in more detail below with reference to FIG. 4.

In some implementations, the executer module 112 may be communicatively coupled to one or more of the string builder module 110 and the filter module 114. The executer module 112 may include one or more of the following elements: an interaction module 126; a monitor module 128; and the binary module 130. The binary module 130 was described above with reference to FIG. 1A, and so, this description will not be repeated here.

The interaction module 126 may include code and routines configured to manage interactions between the executer module 112, the string builder module 110 and the filter module 114. In some implementations, the interaction module 126 may receive data from the string builder module 110. For example, the interaction module 126 may receive the test input data 122 from the string builder module 110. In some implementations, the interaction module 126 may transmit data to the filter module 114 and the string builder module 110. For example, the interaction module 126 may transmit the set data 132 to the filter module 114. The set data 132 will be described in more detail in the following paragraph.

The monitor module 128 may include code and routines configured to monitor execution of the number of instructions executed in the user space responsive to executing the binary module 130 using the test input data 122 as an input for the binary module 130. The monitor module 128 may store the number of instructions executed in a memory such as memory 106. The monitor module 128 may store the number of executed instructions so that the number of executed instructions is associated with the test input described by the test input data 122 which resulted in that number of instructions being executed. The test input described by the test input data 122 may include one or more printable characters selected from the printable character data 120. The number of executed instructions and the associated test input for that number may be stored as set data 132. The set data 132 may describe one or more pairs of associated data. Each pair may include: (1) a test input; and (2) the number of instructions executed by the binary module 130 when executed using the associated test input. The interaction module 126 may transmit the set data 132 to the filter module 114.

The filter module 114 may include code and routines configured to analyze the set data 132 and determine one or more valid characters for a given index. The filter module 114 may determine the one or more valid characters based on the analysis of the set data 132. The valid characters may be used to build a valid input for the binary module 130. The valid characters may be described by the valid character data 138. The filter module 114 may be communicatively coupled to one or more of the string builder module 110 and the executer module 112. The filter module 114 may include one or more of the following elements: the set data 132; a mode module 134; and a range module 136. The set data 132 was described above with reference to the executer module 112, and so, that description will not be repeated here.

The mode module 134 may include code and routines configured to analyze the set data 132 to determine a mode for the one or more numbers included in the set data 132. The mode may be described by mode data. The mode module 134 may store the mode data in a memory such as memory 106 described above with reference to FIG. 1A. The mode module 134 may be communicatively coupled to the range module 136 to provide the mode data to the range module 136.

The range module 136 may include code and routines configured to determine a threshold range. The range module 136 may determine the threshold range based on the mode described by the mode data. For example, the range module 136 may determine the threshold range based on the mode and a testing constant. The testing constant may include any positive real number or float. The testing constant may be provided by a human user of the valid input determination system 105. For example, the testing constant may include a specified positive real number that is provided by the human user of the valid input determination system 105. The human user of the valid input determination system 105 may include the human tester of the binary module 130.

The threshold range may include an upper limit and a lower limit. The range module 136 may determine the upper limit of the threshold range by adding the testing constant to the mode. The range module 136 may determine the lower limit of the threshold range by subtracting the testing constant from the mode. In this way the range module 136 may determine the threshold range. The threshold range may be described by threshold data. The range module 136 may store the threshold data on a memory such as memory 106 described above with reference to FIG. 1A.

The range module 136 may include code and routines configured to determine one or more valid characters. For example, the range module 136 may determine one or more valid characters for a given index of a valid input string for the binary module 130. In some implementations, the range module 136 may determine that any printable character included in the set data 132 whose use as an input for the binary module 130 results in a number of executed instructions outside of the threshold range is a valid character. In some implementations, each valid character determined by the range module 136 may be a candidate for inclusion in the valid input string for the binary module 130.

The valid character data 138 may include data describing the one or more valid characters determined by the range module 136. In some implementations, the valid character data 138 may describe one or more valid characters for a given index of a valid input string for the binary module 130. The filter module 114 may provide the valid character data 138 to the string builder module 110. In some implementations, the filter module 114 may store the valid character data 138 in a memory such as memory 106 described above with reference to FIG. 1A.

In some embodiments, one or more of the string builder module 110, the executer module 112, the interaction module 126, the monitor module 128, the binary module 130, the filter module 114, the mode module 134 and the range module 136 may be implemented using hardware including a field-programmable gate array (FPGA) or an application-specific integrated circuit (ASIC). In some other instances, the string builder module 110, the executer module 112, the interaction module 126, the monitor module 128, the binary module 130, the filter module 114, the mode module 134 and the range module 136 may be implemented using a combination of hardware and software. Thus, the string builder module 110, the executer module 112, the interaction module 126, the monitor module 128, the binary module 130, the filter module 114, the mode module 134 and the range module 136 may be implemented as a hardware device.

FIG. 2A is a block diagram depicting an example 200 of building a string in series over multiple iterations, arranged in accordance with at least one embodiment described herein. The string shown in FIG. 2A may be built by the valid input determination system 105 described above with reference to FIGS. 1A and 1B. The string may include a valid input for the binary module 130 described above with reference to FIGS. 1A and 1B.

In this example 200, the initial state of the string is depicted on the left-hand side of FIG. 2A. The string may be built over multiple iterations. The final iteration depicted in FIG. 2A is "ITERATION 3," which is depicted on the right-hand side of FIG. 2A. Initially, the string may be empty, as shown at the initial state of the string depicted on the left-hand side of FIG. 2A. However, at "ITERATION 3" in this example 200 the valid input determination system 105 has built a string including the valid characters "h," "e," "l" and "p." The string formed by these valid characters includes the word "help." Accordingly, in this example 200 the valid input determination system 105 has determined that the string "help" is a valid input for the binary module 130 described above with reference to FIGS. 1A and 1B.

FIG. 2B is a block diagram depicting an example 205 of building a string in parallel over multiple iterations, arranged in accordance with at least one embodiment described herein. The string may be built by the valid input determination system 105 described above with reference to FIGS. 1A and 1B. The string may include a valid input for the binary module 130 described above with reference to FIGS. 1A and 1B.

In this example 205, the initial state of the string is depicted on the left-hand side of FIG. 2B. The string may be built over multiple iterations. The final iteration depicted in FIG. 2B is "ITERATION 3," which is depicted on the right-hand side of FIG. 2B. Initially, the string may be empty, as shown at the initial state of the string depicted on the left-hand side of FIG. 2B. However, at "ITERATION 3" in this example 205 the valid input determination system 105 has built two strings. The first string includes the valid characters "h," "e," "l" and "p." The first string formed by these valid characters includes the word "help." Accordingly, in this example 205 the valid input determination system 105 has determined that the string "help" is a valid input for the binary module 130. The second string includes the valid characters "c," "u" and "t." The second string formed by these valid characters includes the word "cut." Accordingly, in this example 205 the valid input determination system 105 has determined that the string "cut" is a valid input for the binary module 130.

Figure 3:
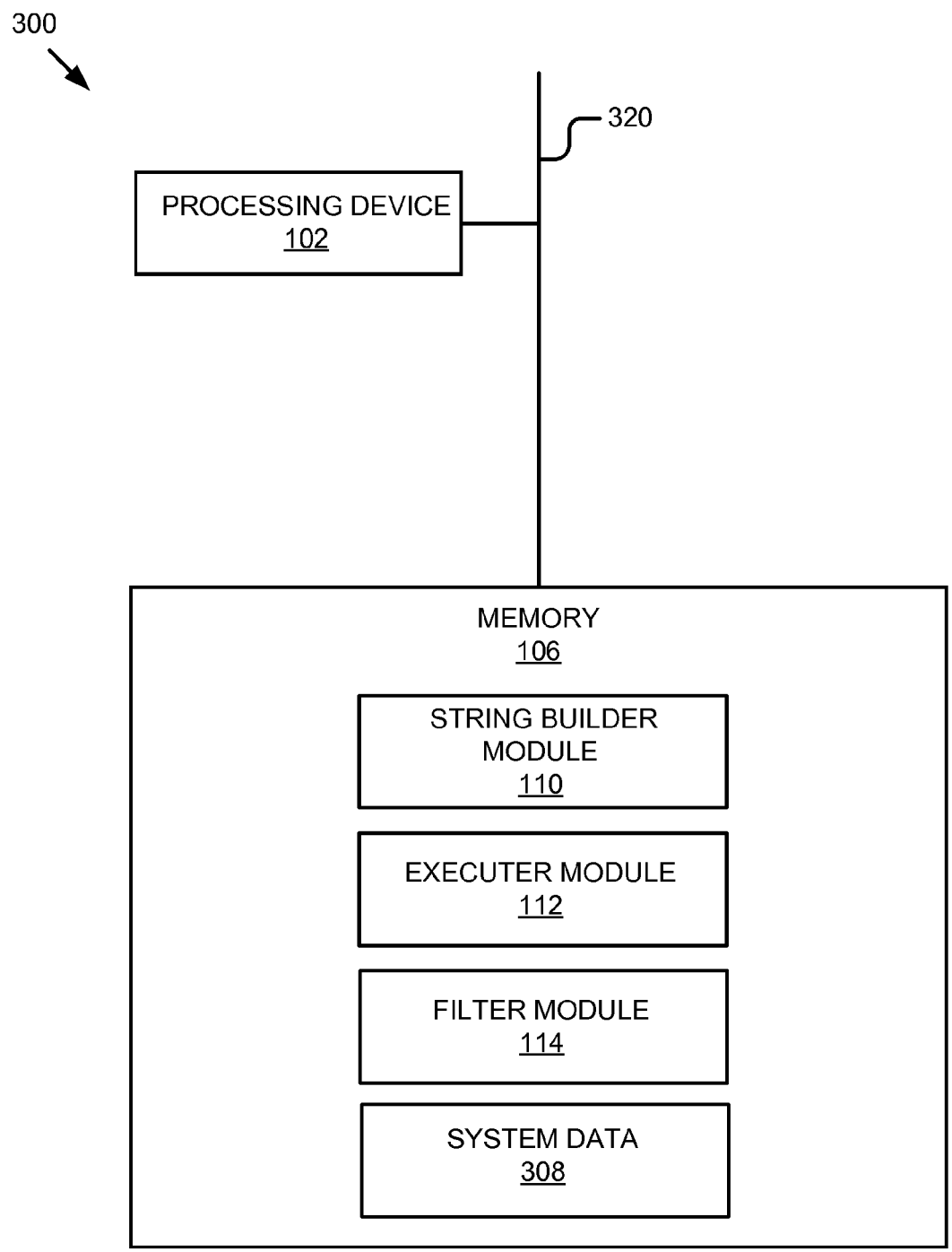
FIG. 3 is a block diagram of an example system to determine a valid input for an unknown binary module.

FIG. 3 is a block diagram of an example system 300 to determine a valid input for an unknown binary module, arranged in accordance with at least one embodiment described herein. The system 300 of FIG. 3 may be an example of the valid input determination system 105 described above with reference to FIGS. 1A and 1B.

The system 300 may include a processing device 102 and a memory 106. The processing device 102 and the memory 106 were described above with reference to FIG. 1A, and so, that description will not be repeated here. The various components of the system 300 may be communicatively coupled to one another via a bus 320.

In the depicted embodiment, the memory 106 may store the string builder module 110, the executer module 112, the filter module 114 and system data 308. The string builder module 110, the executer module 112 and the filter module 114 were described above with reference to FIGS. 1A and 1B, and so, these descriptions will not be repeated here. The system data 308 may include any data used for the system 300 to provide its functionality. For example, the system data 308 may include any of the data described above with reference to FIGS. 1A and 1B, such as one or more of the printable character data 120, the test input data 122, the valid input data 140, the set data 132, or the valid character data 138.

In some implementations, the system 300 may include a processor-based computing device programmed to perform one or more blocks of the method 500 described below with reference to FIGS. 5A, 5B, 5C and 5D.

Figure 4:
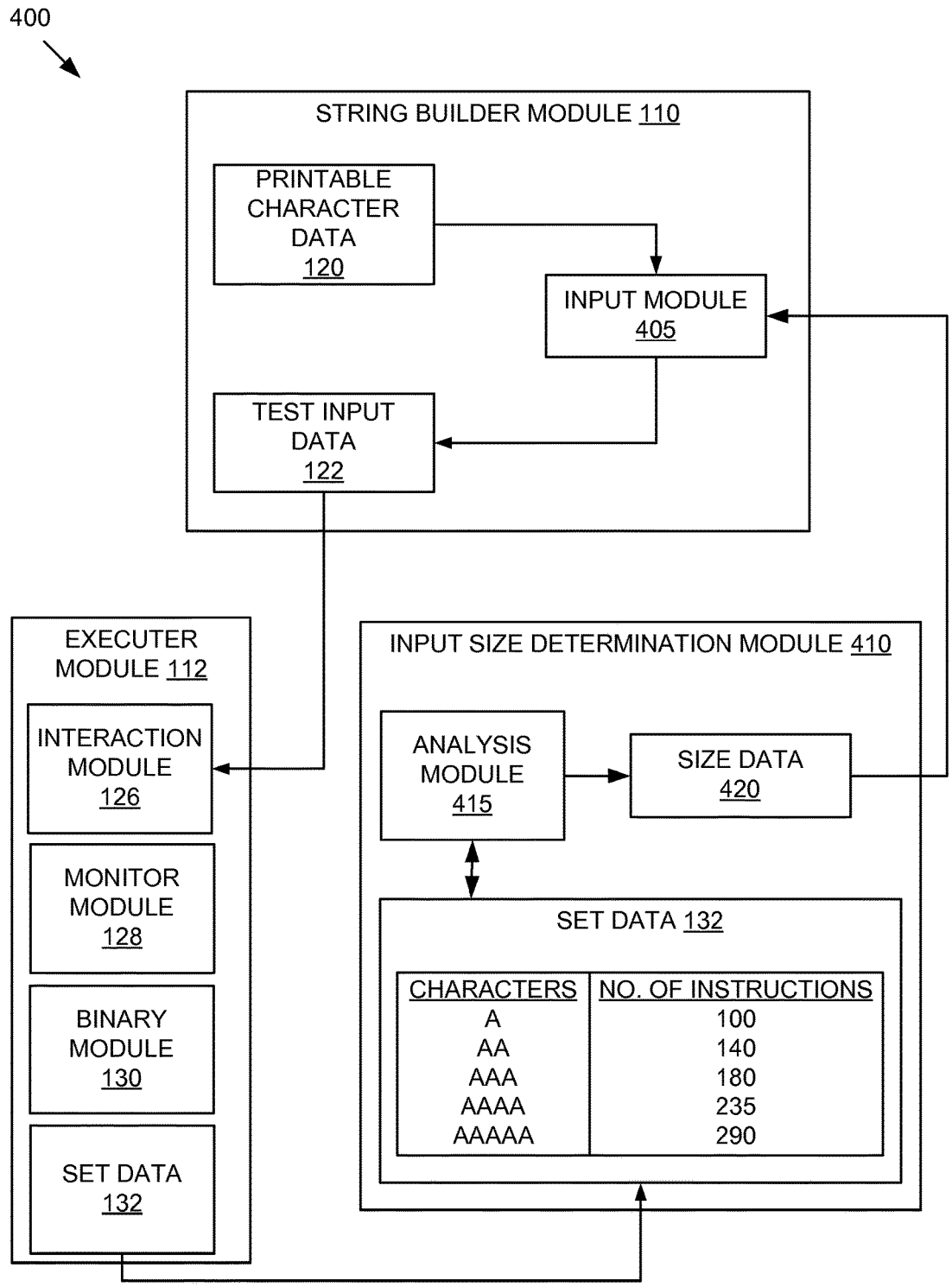
FIG. 4 is a block diagram of a system to determine a size of a valid input for an unknown binary module.

FIG. 4 is a block diagram of a system 400 to determine a size of a valid input for an unknown binary module, arranged in accordance with at least one embodiment described herein. The system 400 may include a processor-based computing device. For example, the system 400 may include a hardware personal computer, laptop, tablet computer, mainframe, server device or any other processor-based computing device configured to function as a server. In some implementations, the system 400 of FIG. 4 may be an example of the valid input determination system 105 described above with reference to FIGS. 1A and 1B. In some implementations, the valid input determination system 105 described above with reference to FIGS. 1A and 1B may be modified to include one or more elements of the system 400.

The system 400 may include the following elements: the string builder module 110; the executer module 112; and an input size determination module 410. The string builder module 110 may be communicatively coupled to the executer module 112 and the input size determination module 410. The executer module 112 may be communicatively coupled to the string builder module 110 and the input size determination module 410. The input size determination module 410 may be communicatively coupled to the string builder module 110 and the executer module 112. The string builder module 110 and the executer module 112 were described above with reference to FIG. 1B, and so, these descriptions will not be repeated here.

The string builder module 110 may include the following elements: printable character data 120; test input data 122; and an input module 405. The printable character data 120 and the test input data 122 were described above with reference to FIGS. 1A and 1B, and so, these descriptions will not be repeated here.

The input module 405 may include code and routines for configuring the number of indices included in one or more of the test input described by the test input data 122. In this way the input module 405 may vary the size of the test input described by the test input data 122 and provided to the executer module 112.

The executer module 112 may include the following elements: the interaction module 126; the monitor module 128; the binary module 130; and the set data 132. The interaction module 126, the monitor module 128, the binary module 130 and the set data 132 were described above with reference to FIG. 1B, and so, these descriptions will not be repeated here.

The executer module 112 may receive the test input data 122 from the string builder module 110. The executer module 112 may determine the set data 132 by: executing the binary module 130 using the test input data 122; monitoring the instructions executed by the binary module 130 after execution; and storing set data 132 describing the number of executed instructions and the test input associated with the number of executed instructions. The executer module 112 may provide the set data 132 to the input size determination module 410.

The size of the test input described by the test input data 122 may be configured by the input module 405. As described above with reference to FIG. 1B, the executer module 112 may include one or more performance analysis tools. In some implementations, a performance analysis tool included in the executer module 112 may be configured to determine if the system 400 has received a specified number of bytes of data before matching the test input data 122 used for the test input with the number of commands being executed responsive to executing the binary module 130 using the test input data 122 as the input for the binary module 130. Experimentation has shown that this problem may be overcome or reduced by determining the size of the test input prior to determining the valid characters to be included in the test input. Once the size of the test is known, then the valid input determination system 105 described above with reference to FIGS. 1A and 1B may start with an empty test input string of that size and change the characters for the test input one index at a time to determine the valid input string.

The input size determination module 410 may include code and routines configured to analyze the set data 132 and determine size data 420 describing the size of the test input. The input size determination module 410 may provide the size data 420 to the input module 405 of the string builder module 110. The string builder module 110 may determine the size of the test input based on the size data 420. In this way, the size of the test input may be determined iteratively by the input size determination module 410 based on analysis of the set data 132 describing the results of previous instances of test inputs for the binary module 130. The performance of the system 400 may be improved over time based on the functionality provided by the input size determination module 410.

In some implementations, the valid input determination system 105 may include the input size determination module 410 which may be configured to determine the size of the test input.

In some implementations, the input size determination module 410 may be configured to include a combination of the strace program and the read( ) system call. The strace program may include code and routines configured to monitor and store data describing any system calls called during execution of the binary module 130. Calling the read( ) system call may provide the input size determination module 410 with parameters which may be analyzed to determine the size of the valid input string. Since read( ) is a system call, the input size determination module 410 may include code and routines configured to extract the parameters resulting from calling the read( ) system call which may be analyzed to determine the size of the test input. In this way, the input size determination module 410 may be configured to provide the string builder module 110 with size data 420 describing the size of the test input for the binary module 130.

In some implementations, the input size determination module 410 may be configured to determine the size data 420 by: executing the binary module 130 with the test input data 122; counting the number of instructions executed by the binary module 130; and incrementing the size of the valid input string described by the size data 420 while analyzing the instructions being executed by the binary module 130.

Experimentation has shown three observations which may be utilized in the code and routines of the input size determination module 410 to improve performance of the system 400. These three observations will now be briefly described.

First, experimentation has shown that the number of instructions executed by the binary module 130 may be a linear function of the size of the valid input string described by the size data 420. This linear function may be referred to as "the linear size determination function." The linear size determination function may be included in the code and routines of the input size determination module 410. The linear size determination function may be used to determine how to modify the size of the test input described by the size data 420 based on the observed number of instructions executed by the binary module 130. For example, the test input may be modified in a way determined by the input size determination module 410 to cause the number of instructions executed by the binary module 130 to be consistent with the linear size determination function.

Second, experimentation has also shown that in some instances the binary module 130 may exit prematurely responsive to being executed using the test data 122 as the input for the binary module 130. In such instances the recorded number of executed instructions may decrease if the size of the test input exceeds the size of the memory allocated for the input.

Third, experimentation has also shown that the difference in the number of instructions being executed by the binary module 130 may oscillate based on different conditions. For example, as described above for FIG. 1B with reference to the executer module 112, the binary module 130 may be executed multiple times with the same test input data 122 as the input in order to identify inaccuracies in the count of the number of instructions being executed by the binary module 130. In some implementations the difference in the number of instructions being executed by the binary module 130 may oscillate based on whether the size of the valid input string is an odd or even number. If the oscillation is known to be related to whether the size of the valid input string is odd or even, then the input size determination module 410 may (1) identify when the size of the valid input string corresponds to an odd or even number that results in oscillation and (2) add or subtract to the count to adjust for the oscillation recorded by the monitor module 128. For example, the size of the test input may be modified by the input size determination module 410 to make the count consistent with the linear size determination function.

The input size determination module 410 may take different steps if the cause of the oscillation is not known. For example, the input size determination module 410 may include code and routines configured to determine the size data 420 in instances where the difference in the number of instructions being executed by the binary module 130 may oscillate based on an unknown condition. For example, the input size determination module 410 may execute the binary module 130 using different size of test inputs to determine the different sizes which correspond to the presence of oscillation being determined in the set data 132. In this way, the input size determination module 410 may determine different size data 420 which may result in oscillation.

After the sizes are determined which result in oscillation, the input size determination module 410 may (1) identify when the size of the test input corresponds to a size which results in oscillation and (2) add or subtract to the count recorded by the monitor module 128 to adjust for the oscillation. For example, the count may be modified by the input size determination module 410 to make the count consistent with the linear size determination function. Alternatively, the size data 420 may be modified to result in a count that is more consistent with the linear size determination function. As the size indicated by the size data 420 is increased, the presence of additional anomalies for the count may be determined by the input size determination module 410. If these anomalies are determined to be present, the input size determination module 410 may make additional adjustments to modify the count.

In some implementations, the input module 405 of the string builder module 110 may include code and routines configured to increase the size of the test input. The input module 405 may increase the size of the test input until a change in the set data 132 is detected by the input size determination module 410. Before the change is detected by the input size determination module 410, the input module 405 may double the size of the test input with each iteration. For example, the first test input may be one index long, the second test input may be two indices long and the third test input may be four indices long. The fourth test input may be eight indices long unless the input size determination module 410 detects a change in the set data 132. The input size determination module 410 may be communicatively coupled to the input module 405 to provide a notification of whether a change in the set data 132 was detected by the input size determination module 410. After a change is detected, the input module 405 may decrease the size of the test input by halves for each iteration subsequent to the detected change.

The input size determination module 410 may include the following elements: the set data 132; an analysis module 415; and the size data 420. The set data 132 was described above with reference to FIG. 1B, and so, that description will not be repeated here. The set data 132 depicted in FIG. 4 includes an example of the content of the set data 132. This example is intended to be illustrative and not limiting. The size data 420 was described above with reference to the input module 405, and so, that description will not be repeated here.

The analysis module 415 includes code and routines configured to analyze the set data 132 and determine size data 420 that is consistent with the linear size determination function. The analysis module 415 may provide the size data 420 to the input module 405 of the string builder module 410.

FIGS. 5A, 5B, 5C and 5D show example flow diagrams of a method 500 to determine a valid input string for an unknown binary module, arranged in accordance with at least one embodiment described herein. The method 500 in some implementations may be performed, in whole or in part, by a system such as the valid input determination system 105 of FIGS. 1A and 1B, the system 300 of FIG. 3 and/or the system 400 of FIG. 4. For instance, the processing device 102 of FIG. 1 or 3 may be programmed to execute computer instructions stored on the memory 106 to perform functions and operations as represented by one or more of the blocks of the method 500 of FIGS. 5A, 5B, 5C and 5D. Although illustrated as discrete blocks, various blocks may be divided into additional blocks, combined into fewer blocks, or eliminated, depending on the desired implementation.

The valid input string may include one or more indices. The index positions of the valid input string may be described by a zero-base system. The first index of the valid input string may be described as "i=0" where the character "i" indicates an index position and the numeral "0" indicates the first index is in the "0" position of the string. A second index of the valid input string may be described as "i=1" and a third position of the valid input string may be described as "i=2." The valid input string may include one or more indices, and each may be described in accordance with the pattern established by the description of the first, second and third index in this paragraph. One or more of blocks 502, 504, 506, 508, 510, 512, 514, 516, 518, 520, and 522 of the method 500 may be executed for the first index of the valid input string. If the valid input string includes a second index, then one or more of blocks 524, 526, 528, and 530 may be executed for the second index. One or more of blocks 524, 526, 528, and 530 may be executed repeatedly until the method 500 determines the end of the valid input string. The method 500 may determine the end of the valid input string when the method 500 has determined valid characters for all the indices of the valid input string.

Figure 5A:
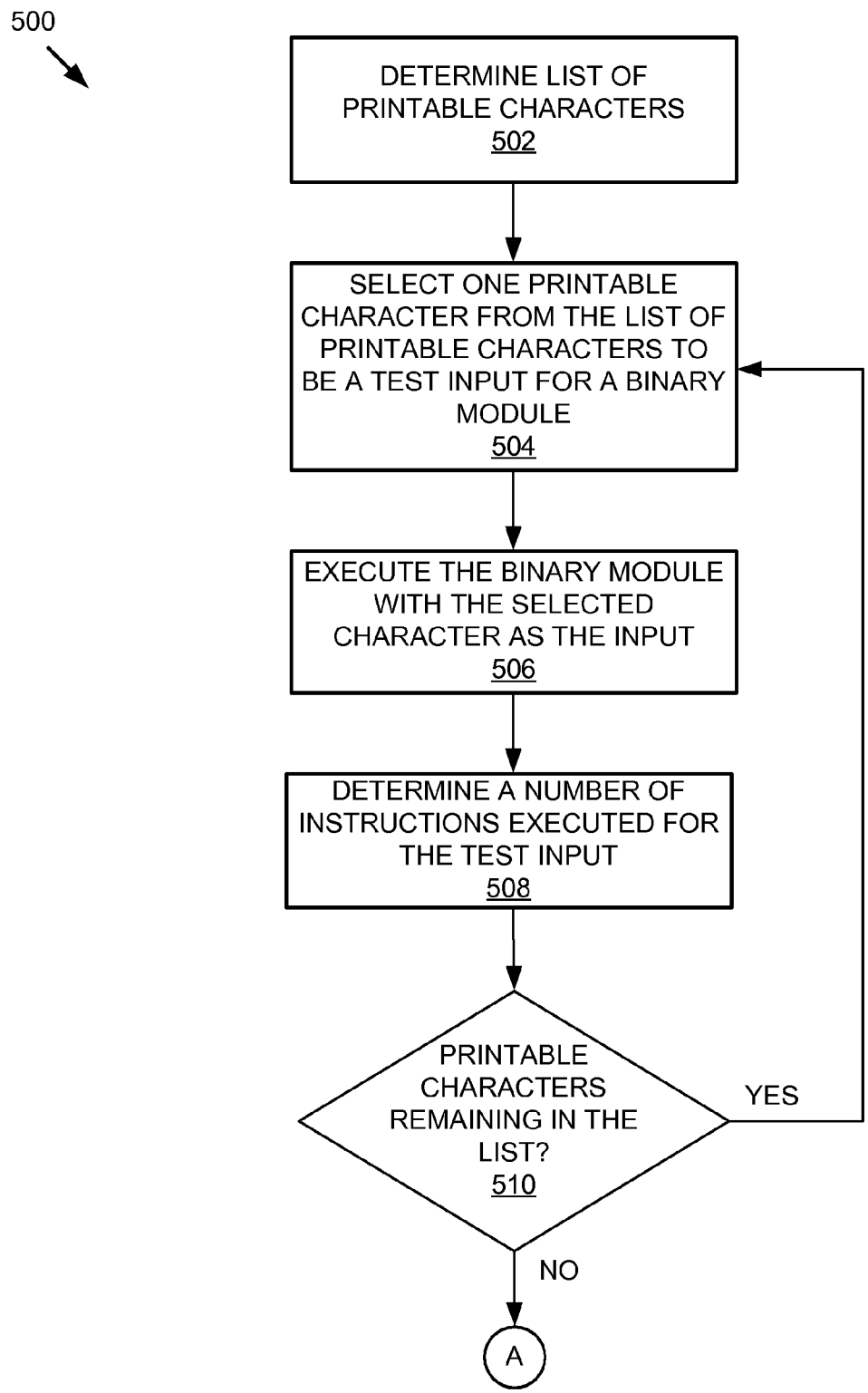
FIGS. 5A, 5B, 5C and 5D show example flow diagrams of a method to determine a valid input for an unknown binary module.

The method 500 may begin at block 502 of FIG. 5A. At block 502, a list of printable characters for a first index of an empty string may be determined. At block 504, one printable character may be selected from the list of printable characters to serve as the test input for the binary module. The binary module may be an unknown binary module whose valid inputs are not known. At block 506, the binary module may be executed using the selected character as the input for the binary module. Executing the binary module at block 506 may result in a number of instructions being executed in the user space. At block 508, the number of instructions executed may be determined.

Blocks 504, 506, and 508 of the method 500 may be repeated until each of the characters included in the list of printable characters is used as the test input for the binary module.

At block 510, a determination may be made regarding whether any printable characters remain in the list of block 502 which have not been used as the test input for the binary module as described by blocks 504 through 508. If it is determined that there are printable characters remaining in the list of 502 which have not been used as a test input for the binary module, then the method 500 may return to block 504. If it is determined that there are no printable characters remaining in the list of block 502 which have not been used as a test input for the binary module, then the method 500 may proceed to block 512 depicted in FIG. 5B.

Figure 5B:
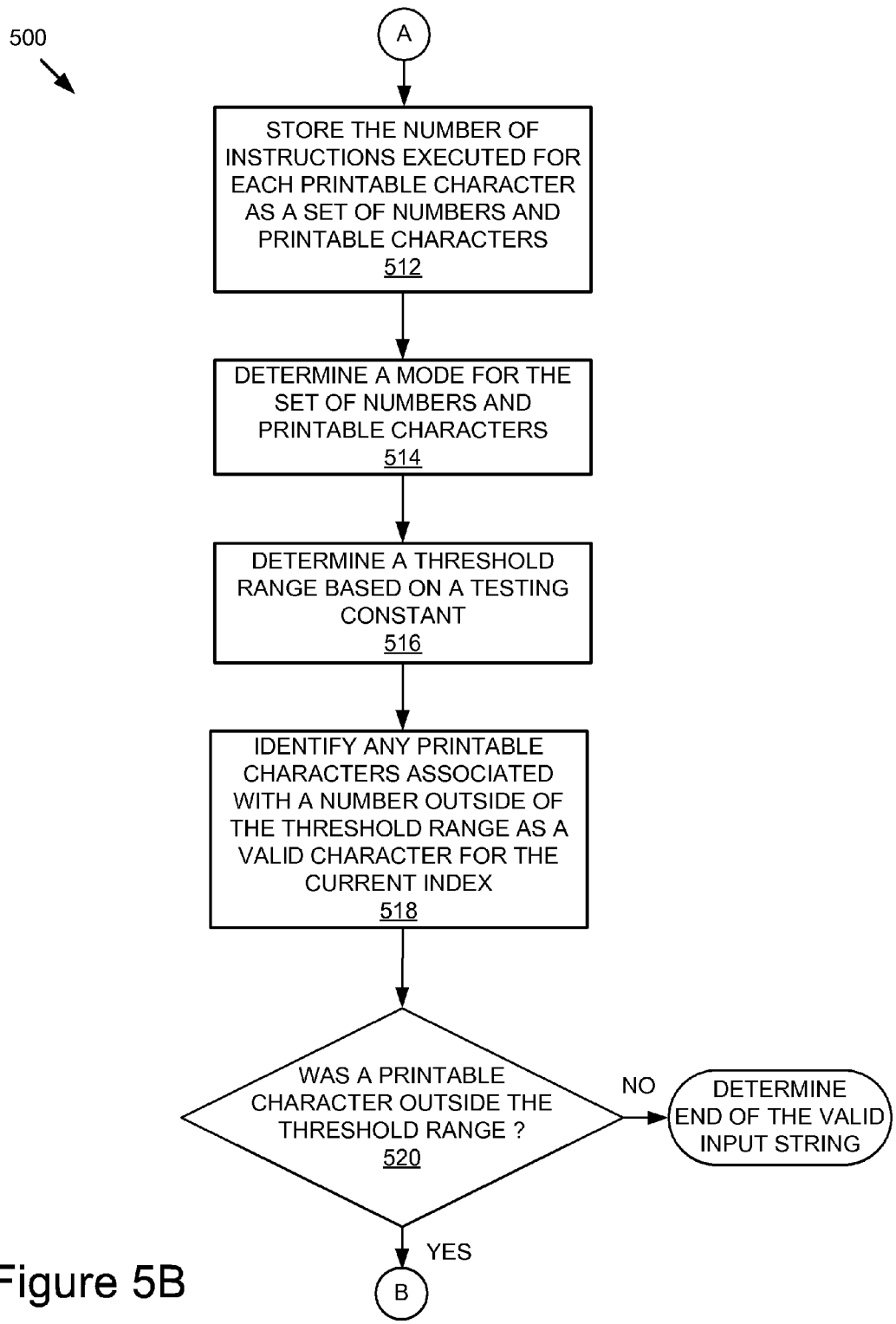

Referring now to FIG. 5B, the method 500 may continue at block 512. At block 512, set data may be stored describing a set of numbers and printable characters. The set of numbers and printable characters may describe each printable character used as the test input and the number of instructions determined to be executed for each of the printable characters at block 508. The set data may be configured so that each printable character included in the set may be associated with the number of instructions that were executed when that printable character was used as the test input for the binary module. At block 514, the mode may be determined for the set of numbers included in the set data. At block 516, the threshold range may be determined based on the testing constant. At block 518, any printable characters associated with a number which is outside of the threshold range may be identified as a valid character for the current index of the valid input string. Valid character data may be stored on a memory describing the one or more valid characters identified at block 518. One or more of the valid characters identified at block 518 and described by the valid character data may be used as valid characters for the current index of the valid input string.

At block 520, a determination may be made regarding whether a printable character was determined to be outside of the threshold range at block 518. If no printable character was determined to be outside of the threshold range at block 518, then no valid character was identified at block 518 and the method 500 has identified the end of the valid input string for the binary module. If at least one printable character was determined to be outside of the threshold range at block 518, then at least one valid character was identified at block 518 and the method 500 may proceed to block 522 depicted in FIG. 5C.

Figure 5C:
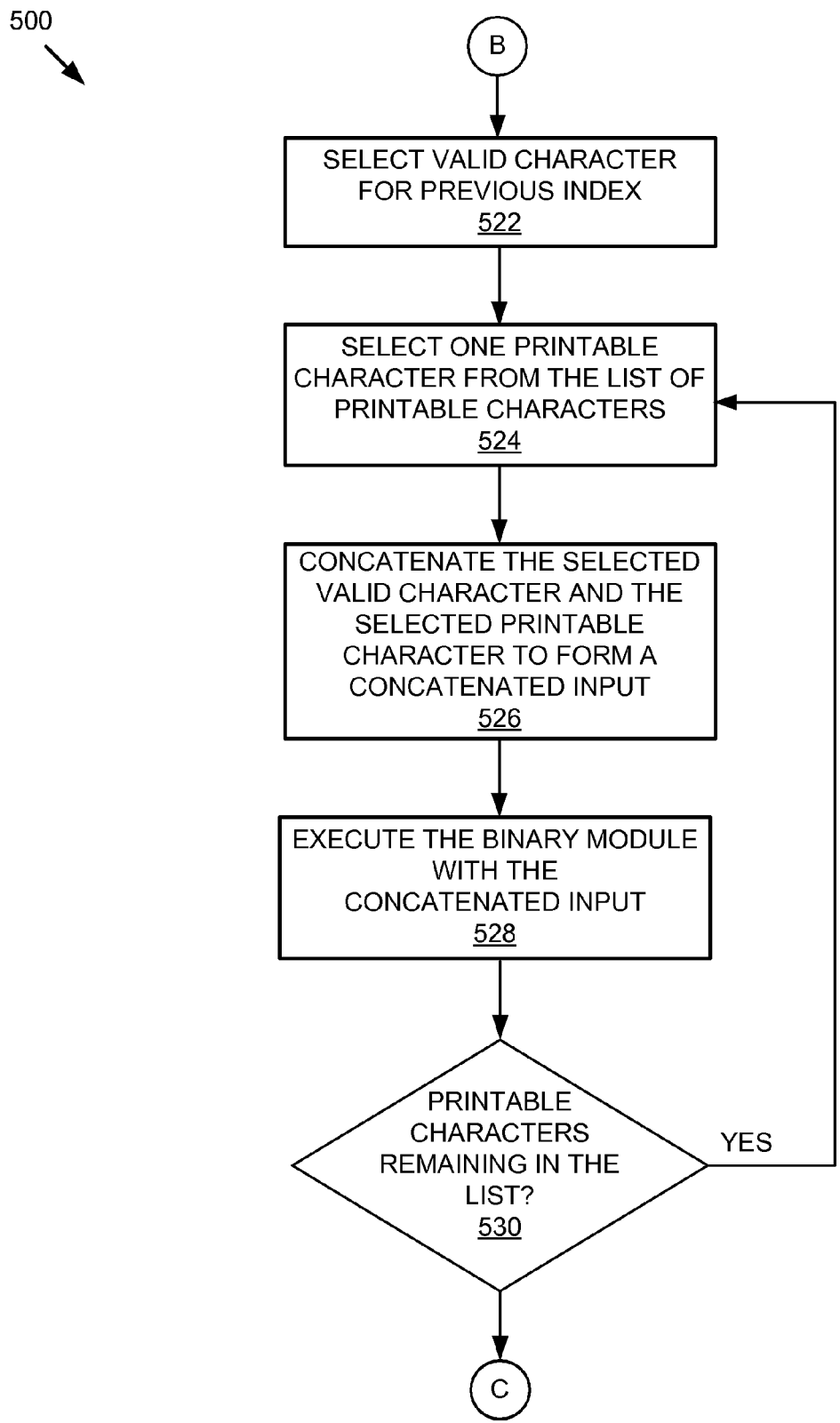

Referring now to FIG. 5C, the method 500 may continue at block 522. At block 522, the method 500 may select one of the valid characters from the valid character data stored for the one or more valid characters identified at block 518. At block 524, the method 500 may select one of the printable characters from the list of printable characters determined at block 502. At block 526, the method 500 may concatenate the selected valid character of block 522 and the selected printable character of block 524 to form a concatenated input for the binary module. The concatenated input may be configured so that the valid character of block 522 is used for the previous index and the printable character of block 524 is used for the current index. In some implementations, the concatenated input may be configured in this way since the valid character has already been determined to be valid for the previous index, whereas it has not been determined whether the printable character is valid for the current index.

At block 528, the method 500 may execute the binary module using the concatenated input. Block 528 may include monitoring the number of instructions executed responsive to executing the binary module using the concatenated input. Block 528 may further include storing set data describing the concatenated input and the number of instructions executed responsive to executing the binary module using the concatenated input.

At block 530, a determination may be made regarding whether any printable characters remain in the list of block 502 which have not been used as an element of a concatenated input for the current index position. If it is determined that there are printable characters remaining in the list of 502 which have not been used as an element of a concatenated input for the current index position, then the method 500 may return to block 524. If it is determined that there are no printable characters remaining in the list of block 502 which have not been used as an element of a concatenated input for the current index position, then the method 500 may proceed to block 532 depicted in FIG. 5D.

Figure 5D:
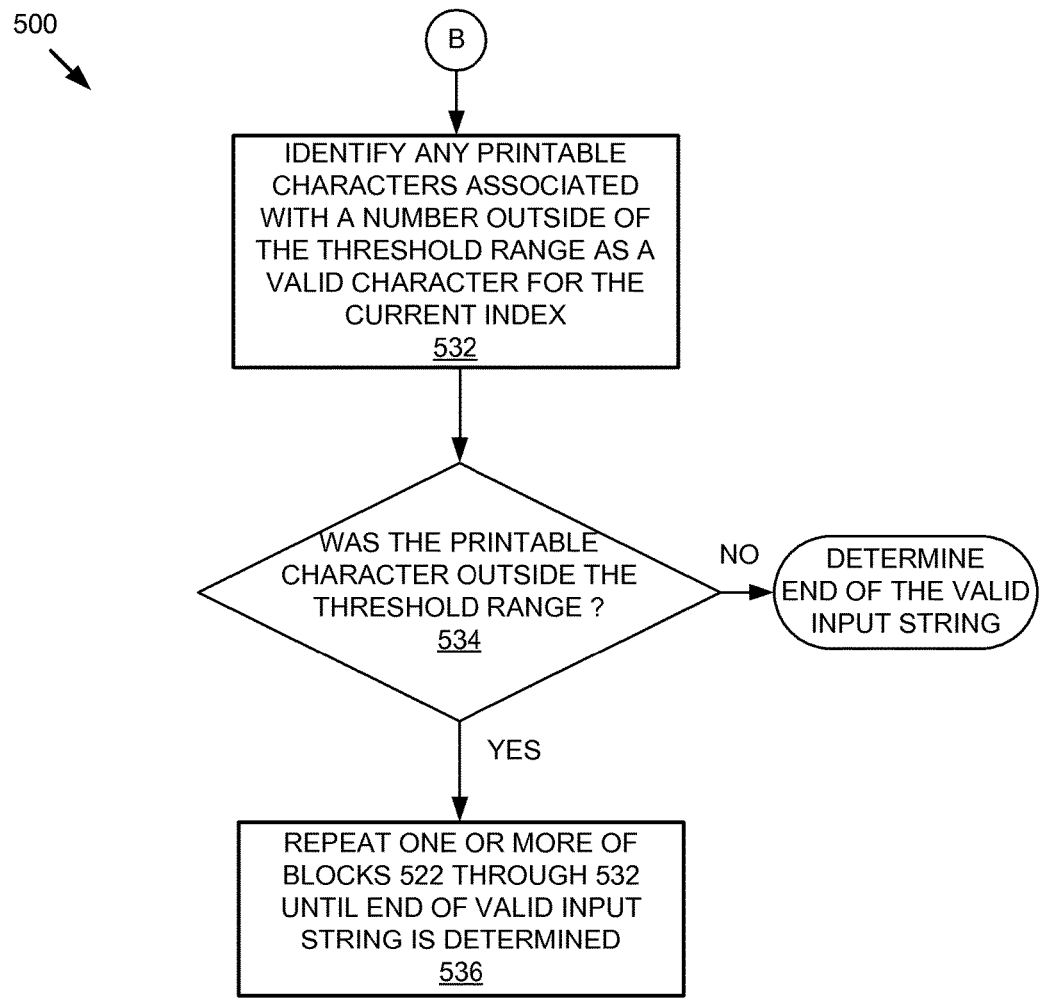

Referring now to FIG. 5D, the method 500 may continue at block 532. At block 532, the method may identify any printable characters included in the set data of block 528 which resulted in a number of instructions being executed which are outside of the threshold range. The method 500 may include determining that any printable characters associated with numbers outside of the threshold range at block 532 are valid characters for the current index. The method 500 may include storing valid character data describing the valid characters for the current index.

At block 534, a determination may be made regarding whether a printable character was identified at block 532. If no printable character was determined to be outside of the threshold range at block 532, then no valid character was identified at block 532 and the method 500 has identified the end of the valid input string for the binary module. If at least one printable character was determined to be outside of the threshold range at block 532, then at least one printable character was identified at block 532 and the method 500 may proceed to block 536. At block 536, the method 500 may repeat one or more of blocks 522, 524, 526, 528, 530, and 532 until the end of the valid input string is determined.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that various changes, substitutions, and alterations could be made hereto without departing from the spirit and scope of the invention.

What is claimed is:

1. A method comprising:
   selecting a set of printable characters as test inputs for an unknown binary module having no known valid input and for which a specification, documentation, and a source code associated with the unknown binary module are unavailable; and
   building a string of printable characters that includes one or more printable characters that are valid inputs for the unknown binary module at one or more index positions in the string of printable characters, the building including:
      executing the unknown binary module with each printable character of the set of printable characters at an index position in the string of printable characters as one of the test inputs for the unknown binary module;
      determining, for each of the printable characters included in the set of printable characters at the index position, a number of instructions executed by the unknown binary module responsive to being executed with each printable character of the set of printable characters at the index position;
      generating set data including each of the printable characters associated with the number of instructions executed for each of the printable characters at the index position; and
      analyzing the set data to identify one or more printable characters of the set of printable characters at the index position as one or more valid inputs for the unknown binary module based on a comparison of the number of instructions associated with each of the printable characters at the index position and a threshold range.

2. The method of claim 1, further comprising determining a mode for the number of instructions included in the set data and using the mode to determine the threshold range.

3. The method of claim 2, wherein the threshold range includes an upper limit and a lower limit, and wherein the method further comprises:
   determining the upper limit of the threshold range by summing the mode and a specified testing constant; and
   determining the lower limit of the threshold range by subtracting the mode from the specified testing constant.

4. The method of claim 1, wherein the analysis includes identifying one or more types of printable characters that are included in the one or more valid inputs for the unknown binary module and determining that the one or more types of printable characters are valid types for the unknown binary module.

5. The method of claim 1, wherein:
   one of the test inputs includes a command and an argument as the test input for the unknown binary module; and
   the analysis includes determining if the test input including the command and the argument is included in the one or more valid inputs for the unknown binary module.

6. The method of claim 1, wherein the analysis includes determining a maximum input size for the unknown binary module.

7. The method of claim 6, wherein a maximum input size causes a buffer overflow event.

8. The method of claim 1, further comprising fuzzing the one or more valid inputs to determine one or more input characteristics that are associated with exceptions for the unknown binary module.

9. The method of claim 1, further comprising seeding a white-box fuzzer with the one or more valid inputs to determine one or more new valid inputs for the unknown binary module.

10. A non-transitory computer-readable medium having computer instructions stored thereon that are executable by a processing device to perform or control performance of operations comprising:
    selecting a set of printable characters as test inputs for an unknown binary module having no known valid input and for which a specification, documentation, and a source code associated with the unknown binary module are unavailable; and
    building a string of printable characters that includes one or more printable characters that are valid inputs for the unknown binary module at one or more index positions in the string of printable characters, the building including:
       executing the unknown binary module with each printable character of the set of printable characters at an index position in the string of printable characters as one of the test inputs for the unknown binary module;
       determining, for each of the printable characters included in the set of printable characters at the index position, a number of instructions executed by the unknown binary module responsive to being executed with each printable character of the set of printable characters at the index position;
       generating set data including each of the printable characters associated with the number of instructions executed for each of the printable characters at the index position; and
       analyzing the set data to identify one or more printable characters of the set of printable characters at the index position as one or more valid inputs for the unknown binary module based on a comparison of the number of instructions associated with each of the printable characters at the index position and a threshold range.

11. The non-transitory computer-readable medium of claim 10, wherein the operations further comprise determining a mode for the number of instructions included in the set data and using the mode to determine the threshold range.

12. The non-transitory computer-readable medium of claim 11, wherein the threshold range includes an upper limit and a lower limit, and wherein the operations further comprise:
   determining the upper limit of the threshold range by summing the mode and a specified testing constant; and
   determining the lower limit of the threshold range by subtracting the mode from the specified testing constant.

13. The non-transitory computer-readable medium of claim 10, wherein the analysis includes identifying one or more types of printable characters that are included in the one or more valid inputs for the unknown binary module and determining that the one or more types of printable characters are valid types for the unknown binary module.

14. The non-transitory computer-readable medium of claim 10, wherein:
   one of the test inputs includes a command and an argument as the test input for the unknown binary module; and
   the analysis includes determining if the test input including the command and the argument is included in the one or more valid inputs for the unknown binary module.

15. The non-transitory computer-readable medium of claim 10, wherein the analysis includes determining a maximum input size for the unknown binary module.

16. The non-transitory computer-readable medium of claim 15, wherein a maximum input size causes a buffer overflow event.

17. The non-transitory computer-readable medium of claim 10, wherein the operations further comprise fuzzing the one or more valid inputs to determine one or more input characteristics that are associated with exceptions for the unknown binary module.

18. The non-transitory computer-readable medium of claim 10, wherein the operations further comprise seeding a white-box fuzzer with the one or more valid inputs to determine one or more new valid inputs for the unknown binary module.

* * * * *